April 19, 1938. W. W. SLAGHT 2,114,861
BEARING CAP
Filed Nov. 1, 1935
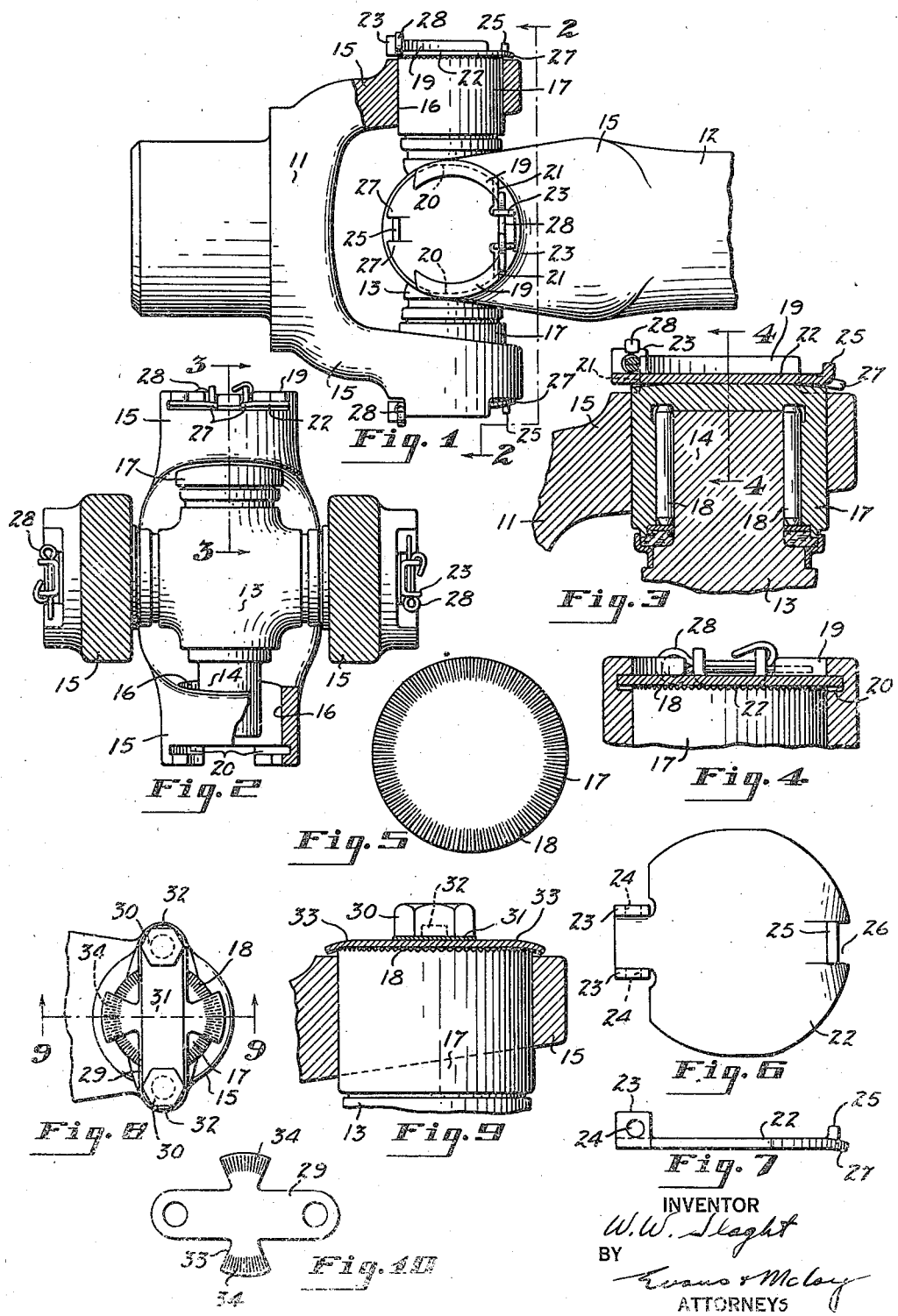
INVENTOR
W. W. Slaght
BY
Evans & McCoy
ATTORNEYS Patented Apr. 19, 1938

2,114,861

UNITED STATES PATENT OFFICE 2,114,861

BEARING CAP

William W. Slaght, Rocky River, Ohio, assignor to Cleveland Steel Products Corporation, Cleveland, Ohio, a corporation of Ohio Application November 1, 1935, Serial No. 47,833

5 Claims. (Cl. 64—17)

This invention relates to power transmitting means and more particularly to universal joints.

One of the objects of the present invention is to provide a universal joint having trunnions and bearing cups for the trunnions with new and improved means for holding the bearing cups against rotation within their supporting means.

Another object is to provide such universal joint construction with means for holding the bearing cups against rotation which means also facilitates the assembly of the universal joint.

A further object is to provide a universal joint having trunnions which may be easily assembled and disassembled.

With the above and other objects in view, the present invention consists in certain features of construction and combinations of parts to be hereinafter described with reference to the accompanying drawing and then claimed.

In the drawing, which illustrates suitable embodiments of the invention,

Fig. 1 is a side elevation of the universal joint, a portion of one of the universal joint yokes being shown in section;

Fig. 2 is a transverse section of the universal joint taken approximately on the line 2—2 of Fig. 1, one of the bearing cups being removed therefrom;

Fig. 3 is an enlarged section taken approximately on line 3—3 of Fig. 2;

Fig. 4 is a fragmentary section taken approximately on line 4—4 of Fig. 3;

Fig. 5 is an enlarged plan view of one of the bearing cups showing the peripheral serrations thereof;

Fig. 6 is an enlarged plan view of one of the bearing cup locking plates shown in Fig. 1;

Fig. 7 is a side elevation of the locking plate shown in Fig. 6;

Fig. 8 is a fragmentary plan view showing a modified means for holding a universal bearing cup against rotation;

Fig. 9 is an enlarged section taken approximately on line 9—9 of Fig. 8; and

Fig. 10 is an under side plan view of the locking plate shown in Figs. 8 and 9.

Referring to the accompanying drawing, in which like numerals refer to like parts throughout the several views, the universal joint shown for the purpose of illustration is of the four trunnion type and includes a pair of yokes 11 and 12 arranged 90 degrees with respect to each other and a joint cross 13 having four trunnions 14 arranged 90 degrees apart.

The two arms 15 of each universal joint yoke are provided with aligned circular apertures 16 which receive the opposed trunnions 14 of the joint cross 13.

Disposed within each aperture 16 is a cup shaped bearing cup 17, which preferably has a close sliding fit with the wall of the aperture so that it can be easily assembled and disassembled.

In the form of universal joint shown in the drawing, a series of small rollers 18 are arranged within the space between the trunnion and bearing wall of the bearing cup. It is to be understood, however, that the present invention is equally as adaptable to a universal joint construction in which the rollers are omitted and the trunnions have direct bearing engagement with the bearing walls of the bearing cups 17.

The present invention is directed to means for holding the bearing cups 17 against axial displacement and also against rotation relative to the trunnions.

Each of the bearing cups 17 is serrated at its closed end as shown in Figs. 4 and 5, to provide a plurality of relatively closely spaced external narrow radial ribs or fine teeth 18 extending around the periphery of the closed end.

In the construction shown in Figs. 1 to 4, inclusive, each arm 15 of each yoke is provided with a pair of arcuate diametrically opposed portions 19 arranged concentric with the yoke arm aperture 16 and of substantially the same radius as the aperture as shown in Fig. 1, the ends of the portions 19 being spaced apart and extending generally in the direction of the axis of the yokes.

The portions 19 are undercut to provide opposed slots 20, the sides of which are parallel at the inner end of the yoke arm and terminate at the outer ends of the portions 19 in arcuate faces.

As shown in Fig. 1, the outer end faces of the portions 19 are in the same plane to provide abutment faces 21 for a purpose to be later described.

As shown in Fig. 3, the end of the trunnion 14 has bearing engagement with the inner face of the closed end of the bearing cup 17.

The bearing cups 17 are held against axial movement within the yoke arm apertures in order to center the universal joint cross 13 with respect to the yokes by metallic plates 22.

The plates 22 have a contour substantially the same as the opposed walls of the slots 20 and fit within the slots 20 with relatively close engagement and also seat against the closed ends of the bearing cups 17 as shown in Figs. 3 and 4.

As shown in Figs. 6 and 7, the plate 22 is formed with a pair of parallel upstanding ears 23 having aligned openings 24 therein, and a substantially diametrically opposite upturned ear 25 arranged at right angles to the ears 23. Also, the metal at the edges of the slot 26 formed by the upturned ear 25 are bent downwardly as viewed in Figs. 3 and 7 to form projecting portions 27.

The plates 22 are preferably hardened and preferably have some resiliency so that the edges 27 will spring slightly while the plates are being inserted in the slots 20.

The plates 22 are inserted in the slots 20 with the ears 23 arranged between the portions 19 as shown in Fig. 1 and adjacent the abutment faces 21. A cotter pin 28 is inserted through the openings 24 and when inserted seats against the abutment faces 21 to prevent displacement of the plate, one of the legs of the cotter pin being bent over one of the ears 23 as shown in Fig. 4 to hold the cotter pin in place.

Upon the plates 22 assuming their assembled position, the edges 27 assume their normal slightly offset position and register with spaces between the fine serrations 18 in the peripheral edge of the bearing cups and thereby hold the bearing cups against rotation with respect to the trunnions and yoke arms.

Upon removal of the cotter pins 28 the plates 22 may be easily removed by placing a tool such as a screwdriver against the ear 25 and striking the same to drive the plates from the slots 20, after which the bearing cups 17 may be removed for disassembly of the universal joint.

In the modified construction shown in Figs. 8, 9, and 10, the bearing cup 17 is formed with the radial serrations 18 but is held in place by a hardened plate 29 which abuts the closed end of the same and which is secured to the yoke arm 15 by suitable cap screws 30, there being a strip 31 of softer metal disposed between the plate 29 and heads of the screws 30 and having one or more portions 32 which may be bent against the heads of the screws to hold the screws to hold the same against inadvertent rotation.

The plates 29 may be formed with portions 33 having serrated faces 34 which when the plates are clamped into position by the screws 30 register with the serrations 18 of the bearing cap 17 and also hold the cap against rotation.

If desired, however, the corners or edges of the portions 33 may be bent or offset to function the same as the edges 27 of the plates 22.

By providing the external peripheral edge of the bearing cups with a plurality of relatively fine radial serrations or teeth as shown in the several views and employing a locking means with teeth for registration with the serrations, I am enabled to provide for a rapid and easy assembly of the joint as automatic registration is provided by means of the relatively fine teeth and as the assembly man in commercial production is not required to remove and insert the bearing cups a number of times before the bearing cups can be located properly with respect to the cup locking means.

In the constructions shown and described, the means for locking the bearing cups in place are simple and economical to manufacture and provide a simple means which facilitates the assembly and disassembly of the universal joint.

Although several embodiments of the invention have been herein shown and described it will be understood that numerous details of the construction shown may be altered or omitted without departing from the spirit of this invention as defined in the following claims.

What I claim is:

1. In a universal joint having a yoke provided with spaced parallel arms having aligned apertures and a cross member having diametrically opposed trunnions disposed within said apertures, closed end bearing cups slidably mounted within said apertures and surrounding said trunnions in end abutting engagement and means for locking each of said bearing cups against axially outward and rotative movement relative to the surrounding aperture, said means comprising a plurality of relatively fine radial toothlike serrations peripherally arranged on the external face of the closed end of the bearing cup, spaced projections extending outwardly of the arm axially with respect to the aperture, each being at a side of the aperture, said projections having aligned end faces and aligned transverse slots facing each other, a plate-like member disposed in said slots in abutting engagement with said external face of the closed end of the bearing member, said plate-like member having relatively sharp projections registered with said toothlike serrations, said plate-like member having an apertured transverse ear extending from one side thereof, and a locking pin extending through said ear and having its end portions abutting said aligned end faces to hold said plate-like member against movement relative to said slots.

2. In a universal joint having a yoke provided with spaced parallel arms having aligned apertures and a cross member having diametrically opposed trunnions disposed within said apertures, closed end bearing cups slidably mounted within said apertures and surrounding said trunnions in end abutting engagement and means for locking each of said bearing cups against axially outward and rotative movement relative to the surrounding aperture, said means comprising a plurality of relatively fine radial toothlike serrations peripherally arranged on the external face of the closed end of the bearing cup, spaced projections extending outwardly of the arm axially with respect to the aperture, each being at a side of the aperture, said projections having aligned end faces and aligned transverse slots facing each other, a plate-like member disposed in said slots in abutting engagement with said external face of the closed end of the bearing member, said plate-like member having relatively sharp projections registered with said toothlike serrations, said plate-like member having a pair of apertured parallel ears extending transversely thereof and located intermediate said spaced projections, and a pin extending through said ears and having its end portions abutting said aligned end faces to hold said plate-like member against movement relative to said slots.

3. In a universal joint of the knockdown type having a power transmitting member provided with diametrically opposed trunnions, and a member provided with a pair of spaced axially aligned apertures surrounding said trunnions, journalling means for said trunnions comprising closed end bearing cups surrounding said trunnions and having a freely slidable fit with said apertures, said bearing cups having a plurality of relatively fine, closely spaced peripherally arranged serrations on the external faces of the closed ends thereof, and means for holding said cups against rotational and outward axial movement relative to said apertures, comprising members having a plurality of relatively fine, closely spaced projections, and means for securing said last mentioned members to said apertured members in abutting engagement with said closed ends, said projections being registerable with said serrations without adjustment of either said last mentioned members or said bearing cups.

4. In a universal joint of the knockdown type having a power transmitting member provided with diametrically opposed trunnions, and a member provided with a pair of spaced axially aligned apertures surrounding said trunnions, journalling means for said trunnions comprising closed end bearing cups surrounding said trunnions and having a freely slidable fit with said apertures, said bearing cups having a plurality of relatively fine, closely spaced peripherally arranged serrations on the external faces of the closed ends thereof, and means for holding said cups against rotational and outward axial movement relative to said apertures, comprising members having a plurality of relatively fine, closely spaced projections, and means for securing said last mentioned members to said apertured members at opposite sides of the apertures thereof in abutting engagement with said closed ends, said projections being registerable with said serrations without adjustment of either said last mentioned members or said bearing cups.

5. In a universal joint of the knockdown type having a power transmitting member provided with diametrically opposed trunnions, and a member provided with a pair of spaced axially aligned apertures surrounding said trunnions, journalling means for said trunnions comprising closed end bearing cups surrounding said trunnions and having a freely slidable fit with said apertures, said bearing cups having a plurality of relatively fine, closely spaced peripherally arranged serrations on the external faces of the closed ends thereof, and means for holding said cups against rotational and outward axial movement relative to said apertures, comprising platelike elements having opposed side portions, said side portions having in their outer edges a plurality of relatively fine, closely spaced projections, and screw means for securing said platelike elements to said apertured members in abutting engagement with said closed ends and for registering said projections with said serrations without relative adjustment of said platelike elements and bearing cups.

WILLIAM W. SLAGHT.